United States Patent
Kratzet

[19]

[11] Patent Number: 6,116,272
[45] Date of Patent: Sep. 12, 2000

[54] DEBRIS RESISTANT OIL PRESSURE RELIEF VALVE

[75] Inventor: Clifford Kratzet, Southfield, Mich.

[73] Assignee: DaimlerChrysler Coroporation, Auburn Hills, Mich.

[21] Appl. No.: 09/277,254

[22] Filed: Mar. 26, 1999

[51] Int. Cl.[7] .................................................. F16K 15/00
[52] U.S. Cl. .................. 137/538; 137/516.11; 137/625.3
[58] Field of Search ............................... 137/516.11, 538, 137/625.3

[56] References Cited

U.S. PATENT DOCUMENTS

| | | |
|---|---|---|
| 3,729,020 | 4/1973 | Koci et al. . |
| 4,125,014 | 11/1978 | Candea . |
| 4,190,198 | 2/1980 | Casuga et al. . |
| 4,426,196 | 1/1984 | Bristow et al. . |
| 4,431,981 | 2/1984 | Fuller et al. . |
| 4,630,480 | 12/1986 | Betterton et al. . |
| 4,643,026 | 2/1987 | Betterton et al. . |
| 4,657,043 | 4/1987 | Ampferer et al. ...................... 137/538 |
| 4,660,595 | 4/1987 | Kuster et al. ........................... 137/538 |
| 4,703,724 | 11/1987 | Candea et al. . |
| 4,716,928 | 1/1988 | Kussel et al. ........................... 137/538 |
| 4,729,349 | 3/1988 | Sonoda et al. . |
| 4,747,378 | 5/1988 | Cantoni . |
| 4,796,464 | 1/1989 | Miller . |
| 4,823,117 | 4/1989 | Burcham . |
| 4,854,273 | 8/1989 | Uesugi et al. . |
| 4,856,652 | 8/1989 | Bowland . |
| 4,860,856 | 8/1989 | Esslinger . |
| 5,085,187 | 2/1992 | Black . |
| 5,121,559 | 6/1992 | Snyder et al. . |
| 5,193,579 | 3/1993 | Bauer et al. . |
| 5,271,429 | 12/1993 | Bauer et al. . |
| 5,339,776 | 8/1994 | Regueiro . |
| 5,398,505 | 3/1995 | Oogushi et al. . |
| 5,425,345 | 6/1995 | Lawrence et al. . |
| 5,499,530 | 3/1996 | Vondell et al. . |
| 5,610,341 | 3/1997 | Tortora . |
| 5,860,395 | 1/1999 | Klotz et al. . |

*Primary Examiner*—Gregory L. Huson
*Assistant Examiner*—Ramesh Krishnamurthy
*Attorney, Agent, or Firm*—Mark P. Calcaterra

[57] ABSTRACT

The present invention provides an oil pressure relief valve having grooves along the wall of the piston. These grooves channel pressurized oil through areas of the vents which are most susceptible to debris buildup. This channeling of pressurized oil acts to flush the vents and wipe away debris. As a result, the valves are able to operate freely.

10 Claims, 3 Drawing Sheets

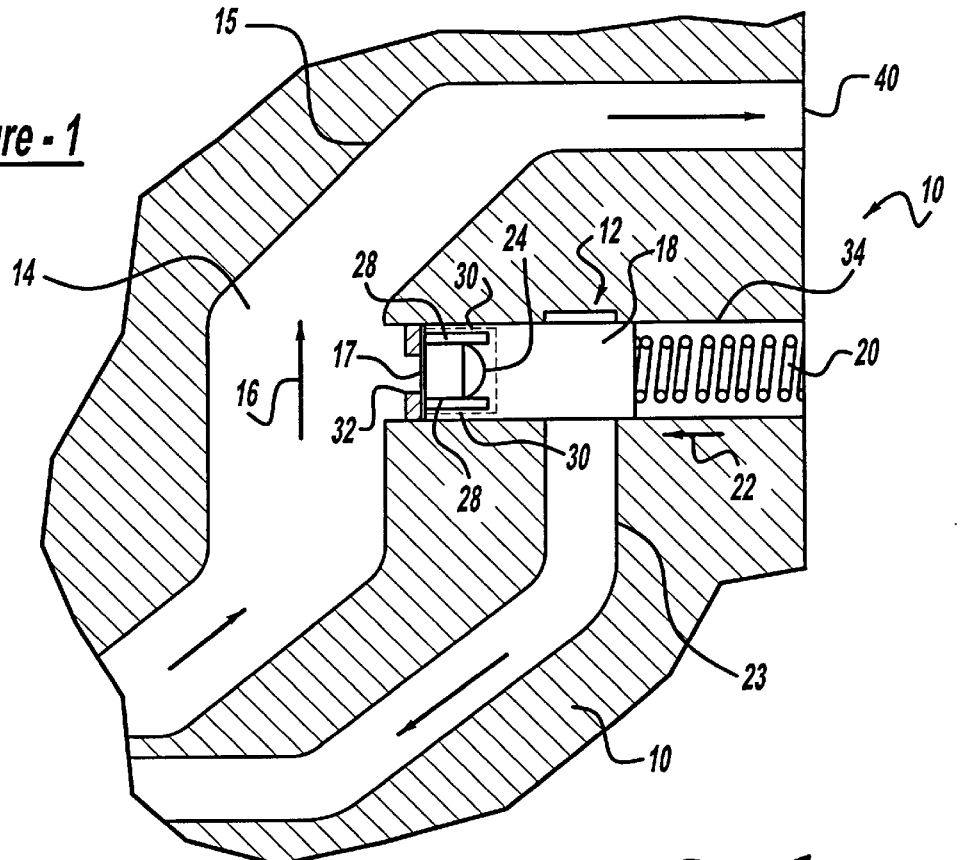
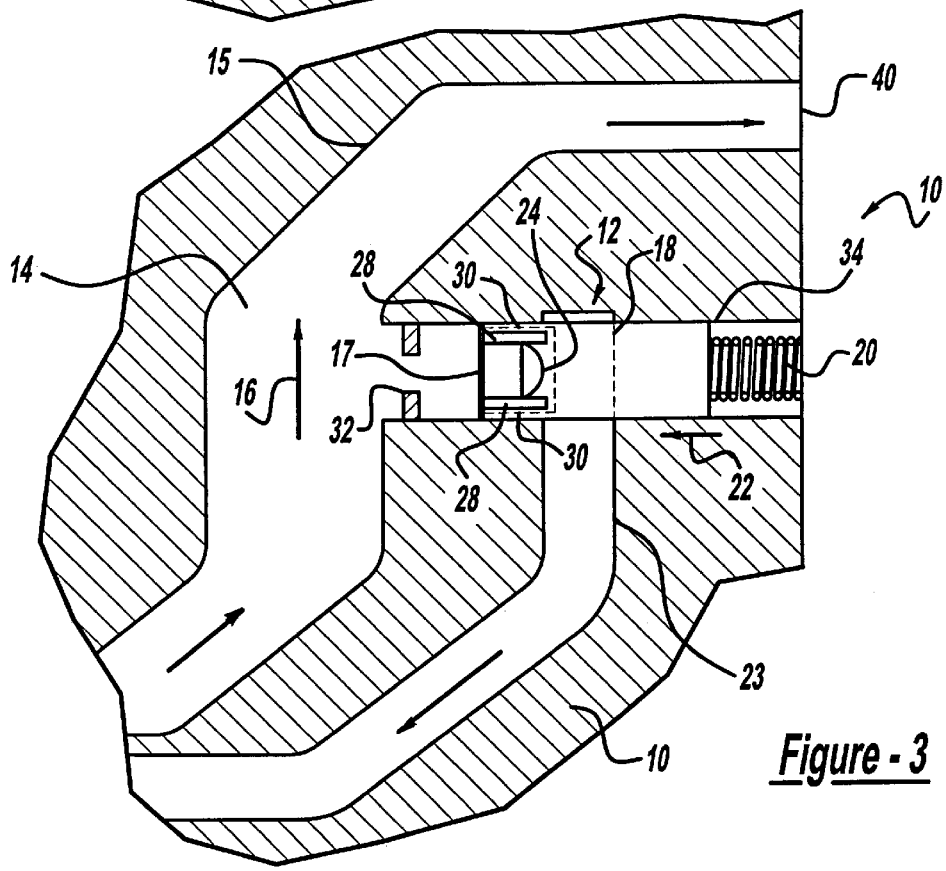

DEBRIS RESISTANT OIL PRESSURE RELIEF VALVE

BACKGROUND OF THE INVENTION

I. Technical Field

The present invention relates generally to a pressure relief valve, and more particularly, to a pressure relief valve which reduces the build-up of debris therein.

II. Discussion

Lubrication systems play a critical role in the operation of many different types of machinery. For instance, lubrication systems play a critical role in internal combustion engine performance and operation. Typical internal combustion engines have a number of components which move and wear against one another causing frictional wear. This wear, over a period of time, compromises the performance and durability of the engine as a whole. To combat this wear, internal combustion engines are fitted with a lubrication system which provides oil to these components, thereby reducing frictional wear and increasing the life of the engine. Without this lubrication system, the engine would most certainly self-destruct within a short period of time.

Full pressure lubrication systems for internal combustion engines use an oil pump to circulate oil to the necessary components. This pump, itself, is driven by the internal combustion engine. Typically, this pump has a greater capacity than the engine requires for sufficient circulation of oil. This ensures that all the critical components within the engine are lubricated, irrespective of the speed at which the internal combustion engine is operating. However, similar to deprivation of oil, excessive pressurization of oil can result in the destruction of critical components within the engine. Specifically, over pressurization may result in the destruction of the oil filter or other components of the engine lubrication system. To combat this problem, oil pumps are fitted with pressure relief valves. These valves vent oil back to the engine lubrication system's sump when the oil pressure becomes too high, thus maintaining a constant oil pressure.

Usually, these valves have a piston positioned within a cylindrical bore which is biased in one direction by a spring. Pressurized oil from the oil pump applies a force on the piston which is opposite to the spring. As the oil pressure increases, the spring is compressed, causing movement of the piston which exposes oil vents or the edge of the piston. These vents allow oil to pass back to the sump or pump. However, this system has some drawbacks.

Debris tends to collect in certain areas within the vents, causing the piston to stick in one position or another. If the piston is stuck closed, not allowing oil to vent back to the sump or pump, then the lubrication has no way to vent high pressure resulting in the damage as discussed above. If the valve is stuck open, then oil vents backs to the sump or pump irrespective of the oil pressure, thereby starving the internal combustion engine components of oil. As discussed previously, this results in self-destruction of the engine. The present invention was developed in light of these drawbacks.

SUMMARY OF THE INVENTION

The present invention addresses the aforementioned drawbacks, among others, by providing an oil pressure relief valve having grooves along the outer diameter of the piston which intersect the vents. These grooves channel pressurized oil through areas of the vents which are most susceptible to debris buildup. This channeling of pressurized oil acts to flush the vents and wipe away debris. As a result, the valves are able to operate freely.

In another aspect of the present invention, the vents are semicircular in shape. This shape, although facilitating the venting of oil, creates small corners at each end of each semicircle. These semicircles are very susceptible to debris build up due to low velocity. The present invention provides grooves extending from each corner toward the entrance and leading edges of the vents in the valve to maximize flushing.

Additional advantages and features of the present invention will become apparent from the subsequent description and the appended claims taken in conjunction with the accompanying drawings.

BRIEF DESCRIPTION OF THE DRAWINGS

The present invention will become more fully understood from the detailed description and the accompanying drawings, wherein:

FIG. 1 is a cross-sectional view of an oil pump assembly using an oil pressure relief valve according to the present invention;

FIG. 3 is a cross-sectional view of an oil pump assembly using an oil pressure relief valve according to the present invention;

DETAILED DESCRIPTION OF THE PREFERRED EMBODIMENTS

Figure 2:
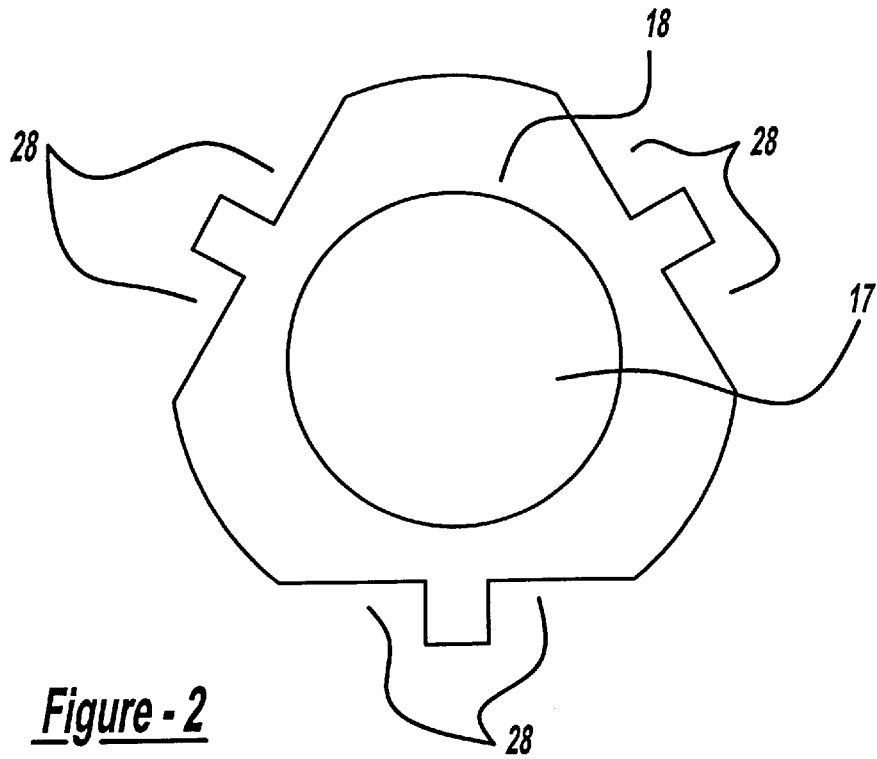
FIG. 2 is a cross-sectional view of a piston of an oil pressure relief valve according to the present invention.

The following description of the preferred embodiments is merely exemplary in nature and is in no way intended to limit the invention, its application, or uses.

As is known, typical pumps have a high side, a low side and a pressurizing element located therebetween. The low side provides media, drawn from a source, to the pressurizing element within the pump. The pressurizing element pressurizes the media and transports it to the high side. The pressurized media then has the required pressure to transport it through various passages within a vehicle engine to the critical components therein.

Referring now to FIG. 1, a cross section of an oil pump outlet 10 having an oil pressure relief valve 12 according to the present invention is shown. In general, pressurized oil 14, pressurized by a pump, passes through a return circuit designated by channel 15 in a direction as shown by arrows 16. This pressurized oil travels to the critical components of an internal combustion engine through output port 40. Oil pressure relief valve 12 fluidly communicates with channel 15 through entrance 32 such that pressurized oil 14 is able to travel into oil pressure relief valve 12, thereby actuating piston 18 as will be discussed.

Referring now to FIGS. 1 and 2, the present invention is described in greater detail. Pressure relief valve 12 generally comprises a cylindrical bore 34 with a piston 18 disposed therein. Cylindrical bore 34 can either be machined into the casting of oil pump outlet 10 or can be a sleeve or other suitable device positioned therein. Piston 18 is generally cylindrically shaped and has a bore 17 disposed in an end proximate entrance 32. Spring 20 biases piston 18 in the direction shown by arrow 22. A plurality of hemispherically shaped vent holes 24, having corner portions 30, are disposed around the outer surface of piston 18. Each vent hole 24 provides fluid communication between passage 23 and bore 17. Leading to each corner portion 30 of vent hole 24 are grooves 28 which extend down along piston 18 toward entrance 32 of oil pressure relief valve 12. Grooves 28 provide a space between piston 18 and cylindrical bore 34, creating a fluid channel therebetween which leads up to corner portions 30.

Figure 4:
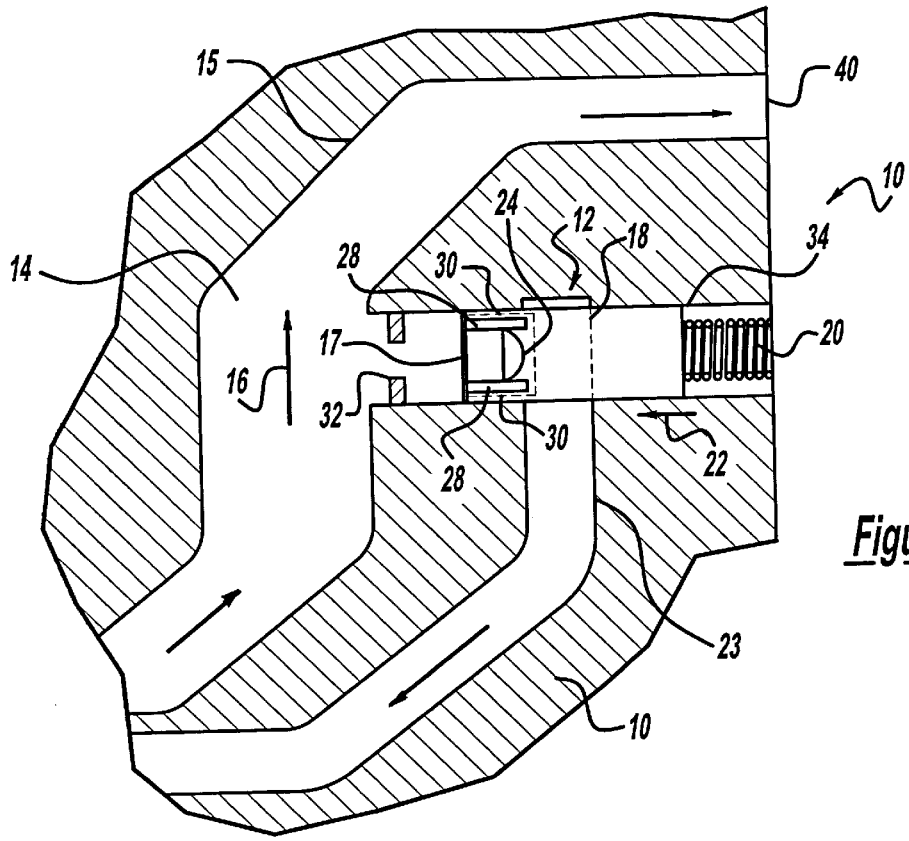
FIG. 4 is a cross-sectional view of an oil pump assembly using an oil pressure relief valve according to the present invention.

Referring now to FIGS. 1, 3 and 4, the operation of the present invention is now described. In FIG. 1, pressurized oil 14 pushes against the inner surface of bore 17 of piston 18. This pushing action exerts a force against spring 20. Spring 20, which is biased in the direction shown by arrow 22, applies a force in the opposite direction to that exerted by pressurized oil 14. Since pressurized oil 14 in FIG. 1 has a pressure lower than a predetermined value, the force of spring 20 exceeds the oil pressure of pressurized oil 14, thereby maintaining piston 18 in its present position. Since vent holes 24 and grooves 28 do not yet communicate with passage 23, pressurized oil cannot leak to passage 23 and reduce the pressure of pressurized oil 14.

Referring now to FIG. 3, when the pressure of pressurized oil 14 increases beyond a predetermined value, piston 18 moves in a direction opposite arrow 22 and through the position as shown. As the piston moves, grooves 28 are exposed to passage 23 allowing pressurized oil 14 to flow therethrough. Grooves 28 allow pressurized oil 14 to leak around piston 18 and into passage 23. Pressurized oil 14 then travels through passage 23 and back to the low side of oil pump outlet 10. Because of the low cross sectional area of grooves 28, the velocity of pressurized oil 14 traveling therethrough is high. As a result, this high speed oil, directed toward corners portions 30, tends to wash these areas of and provide an escape path for debris. Since these grooves are exposed to passage 23 before vent holes 24 and due to the small cross section of grooves 28, the flow of oil therethrough provides a slow rate of oil pressure drop of pressurized oil 14 than which is associated with vent holes 24.

Referring now to FIG. 4, as the pressure of pressurized oil 14 increases further, the piston 18 continues moving in a direction opposite to arrow 22 thereby exposing vent holes 24 to passage 23. This action results in a much further increase of cross sectional area exposed to passage 23 than as discussed with regard to FIG. 2. In this position, the force of pressurized oil 14 acting on piston 18 is countered by spring 20. The flow of pressurized oil 14 continues through grooves 28 thereby preventing the build up of debris in these corners.

Figure 6:
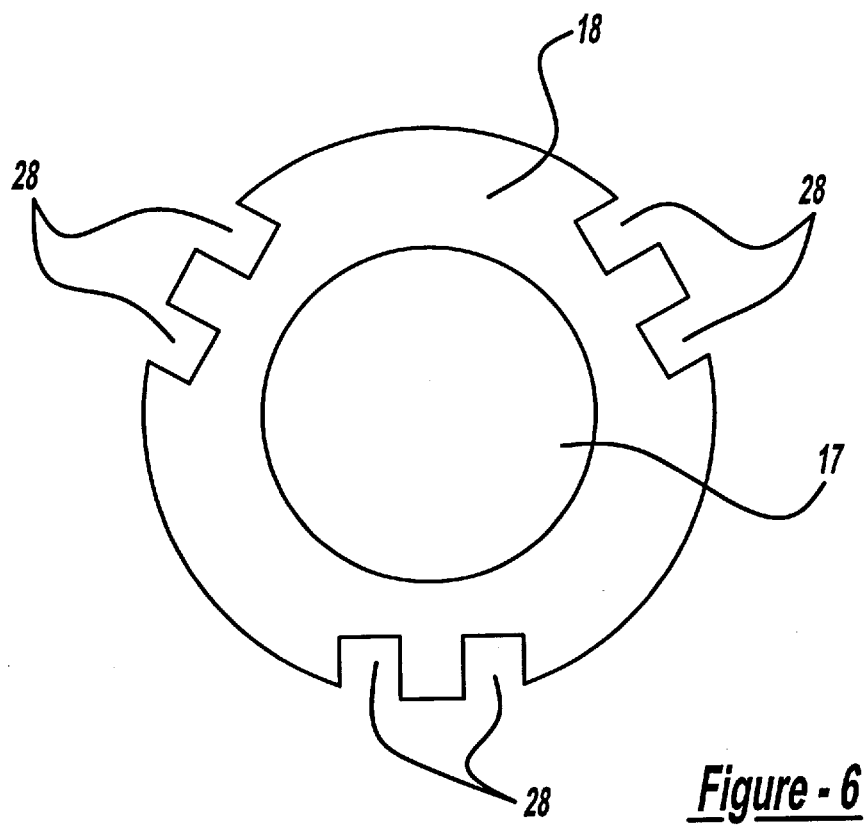
FIG. 6 is a cross-sectional view of a piston of an oil pressure relief valve according to the present invention.
Figure 5:
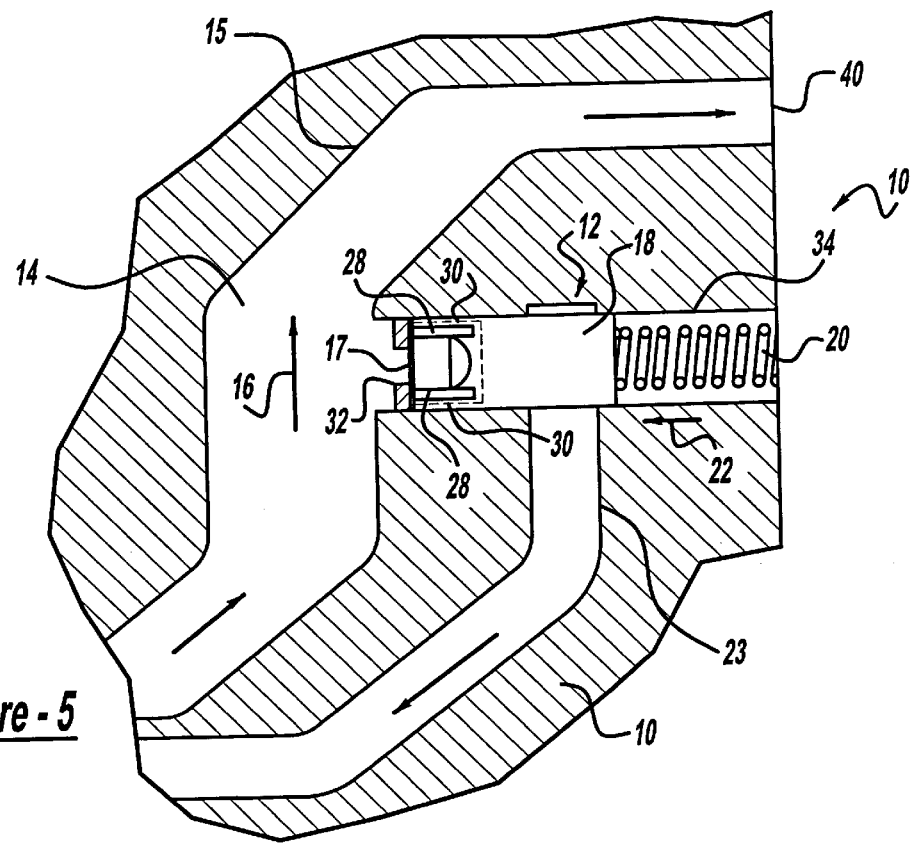
FIG. 5 is a cross-sectional view of an oil pump assembly using an oil pressure relief valve according to the present invention.

Referring now to FIGS. 5 and 6, a second embodiment of the present invention is shown and described. The operation of the second embodiment is the same as that described for the first embodiment discussed above. Here, however, grooves 28 are shown being shaped as side ground crescents. In the embodiment described above, grooves 28 were preferably manufactured as plunge ground slots with parallel sides. Radial, longitudinal, altitude and lateral controls were needed for the original embodiment, though only radial and longitudinal controls are needed for the current embodiment.

While the above detailed description describes the preferred embodiment of the invention, it should be understood that the present invention is susceptible to modification, variation, and alteration without deviating from the scope and fair meaning of following claims.

What is claimed is:

1. A pressure relief valve for a lubrication system of a vehicle, comprising:

a housing having a generally cylindrical bore, said cylindrical bore having a first end and a second end, said first end having an external passageway for conducting lubricant from a high pressure side of said lubrication system into and out of said cylindrical bore;

a piston disposed within said cylindrical bore, said piston biased toward said external passageway by a biasing member, and said piston in a sealing relationship therewith, said piston having a piston bore in an end of said piston proximate said external passageway, said piston having at least one hemispherically shaped vent hole disposed on an external surface of said piston and passing into said piston bore, said hemispherical shape defining two corner portions, said piston having at least one groove extending along said external surface of said piston and intersecting said vent hole; and said cylindrical bore having an aperture disposed therein, said lubricant forcing said piston against said biasing member and positioning said groove to provide fluid communication between said groove and said piston bore when said lubricant is at a predetermined pressure.

2. A pressure relief valve as claimed in claim 1, further comprising a second groove extending along said external surface of said piston, each said groove intersecting a respective corner portion of said vent hole.

3. A pressure relief valve as claimed in claim 1, further comprising a plurality of vent holes and a plurality of grooves, each said groove intersecting a respective corner portion of said vent hole.

4. A pressure relief valve as claimed in claim 1, wherein said groove extends from said vent hole and terminates at a point proximal to said external passageway.

5. A pressure relief valve as claimed in claim 1, wherein said groove is a plunge ground slot.

6. A pressure relief valve as claimed in claim 1, wherein said groove is a side ground crescent.

7. A pressure relief valve as claimed in claim 1, wherein said biasing member is a spring.

8. A pressure relief valve for a lubrication system of a vehicle, comprising:

a housing having a generally cylindrical bore, said cylindrical bore having a first end and a second end, said first end having an external passageway for conducting lubricant from a high pressure side of said lubrication system into said cylindrical bore;

a piston disposed within said cylindrical bore, said piston biased toward said external passageway by a biasing member, and said piston in a sealing relationship therewith, said piston having a piston bore disposed in an end of said piston proximate said external passageway, said piston having a plurality of vent holes disposed along an external surface of said piston, each said vent hole having a hemispherical shape and connecting said piston bore with said external surface, said hemispherical shape of each said vent hole defining two corner portions in each vent hole, said piston having a plurality of grooves extending along said external surface and intersecting a respective corner portion of each said vent hole, each said groove extending from said corner portion toward said external passageway and terminating at said end of said piston proximate said external passageway; and said cylindrical bore having an aperture disposed therein, said lubricant forcing said piston against said biasing member and positioning said grooves to provide fluid communication between said grooves and said piston bore when said lubricant is at a predetermined pressure.

9. A pressure relief valve as claimed in claim 8, wherein each said groove terminates at a point which is closer to said external passageway than any portion of said vent holes.

10. A pressure relief valve as claimed in claim 8, wherein said lubricant forces said piston against said biasing member and positions said vent hole in said cylindrical bore to provide fluid communication between said aperture and said piston bore when said lubricant is at a predetermined pressure.

* * * * *